US007478343B2

(12) United States Patent
Kubo et al.

(10) Patent No.: US 7,478,343 B2
(45) Date of Patent: Jan. 13, 2009

(54) METHOD TO CREATE MULTIPLE ITEMS WITH A MOUSE

(75) Inventors: Yoshiaki Kubo, Yamato (JP); Hisaya Morita, Yokohama (JP); Kohji Nakamori, Yamato (JP); Akihiko Nakamura, Yamato (JP); Akira Yoshida, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 11/463,702

(22) Filed: Aug. 10, 2006

(65) Prior Publication Data

US 2007/0035514 A1 Feb. 15, 2007

(30) Foreign Application Priority Data

Aug. 15, 2005 (JP) ............................. 2005-235399

(51) Int. Cl.
*G06F 3/048* (2006.01)
*G09G 5/00* (2006.01)

(52) U.S. Cl. ...................... 715/856; 715/861; 715/862; 715/964; 345/156

(58) Field of Classification Search ................ 715/964, 715/856, 861, 812, 862; 345/156
See application file for complete search history.

(56) References Cited

U.S. PATENT DOCUMENTS

| 4,727,496 | A | * | 2/1988 | Ryouki ....................... 345/441 |
| 5,448,688 | A | * | 9/1995 | Hemingway ................ 345/441 |
| 5,550,563 | A | * | 8/1996 | Matheny et al. ............ 345/168 |
| 5,760,764 | A | * | 6/1998 | Martinelli .................. 345/160 |
| 5,764,936 | A | * | 6/1998 | Evans et al. ................ 715/861 |
| 6,466,197 | B1 | * | 10/2002 | Kim et al. .................. 345/156 |
| 7,218,329 | B2 | * | 5/2007 | Ueda .......................... 345/619 |
| 7,302,650 | B1 | * | 11/2007 | Allyn et al. ................ 715/859 |
| 7,366,995 | B2 | * | 4/2008 | Montague ................... 715/798 |

FOREIGN PATENT DOCUMENTS

| JP | 59-141388 | 8/1984 |
| JP | A59141388 | 8/1984 |
| JP | 02-118817 | 5/1990 |
| JP | A2118817 | 5/1990 |
| JP | 07175842 | 7/1995 |
| JP | 08-137621 | 5/1996 |
| JP | 08-139621 | 5/1996 |
| JP | A8137621 | 5/1996 |
| JP | 2001005985 | 1/2001 |
| JP | 2001-337944 | 12/2001 |
| JP | A2001337944 | 12/2001 |
| JP | 2004110217 | 4/2004 |

* cited by examiner

*Primary Examiner*—Tadesse Hailu
*Assistant Examiner*—Nicholas S Ulrich
(74) *Attorney, Agent, or Firm*—Justin Dillon; Mark S. Walker

(57) ABSTRACT

A system, method, and computer program product that have a graphical user interface capable of easily generating different kinds of items on a canvas by a user by operation of a mouse pointer on the canvas without requiring movement of the mouse pointer between a palette and the canvas are disclosed. In accordance with one embodiment of the present invention a system is provided which comprises displaying means to display a pointer and a positional reference on a display screen; input means to accept an operation by a user; and control means to control a position and a function of the pointer on the display screen in response to the operation; wherein the control means determines the function of the pointer according to a distance between the position of the pointer and the positional reference.

14 Claims, 14 Drawing Sheets

DOUBLE CLICK

METHOD TO CREATE MULTIPLE ITEMS WITH A MOUSE

CROSS-REFERENCE TO RELATED APPLICATIONS

This application claims the benefit of priority of Japanese Patent Application No. 2005235399 filed on Aug. 15, 2005, and entitled "A METHOD TO CREATE MULTI ITEMS WITH MOUSE" hereby incorporated by reference herein for all purposes.

BACKGROUND

1. Technical Field

The present invention relates to a graphical user interface, and, in particular, to a system, method, and computer program product to implement a graphical user interface capable of easily creating items in software such as a drawing tool, a CAD program, a word processor, a spreadsheet program, and the like which use a pointing device such as a mouse, and the like.

2. Description of Related Art

Usual plotting software such as a drawing tool, a CAD program, and the like, is generally provided with two windows called a palette and a canvas. FIG. 13 shows an example of a display screen of a conventional plotting software application. In FIG. 13, reference numeral 1000 designates a display screen, reference numeral 1001 designates a canvas, and reference numeral 1002 designates a palette including items 1002a such as a line, a rectangle, a circle, a star shape, a text, and the like. Also, reference numeral 1003 designates a mouse pointer.

As shown in FIG. 14, in the graphical user interface of conventional plotting software, when a user wants to draw a line, a rectangle, a circle, or the like, the user first chooses one of the items 1002a to be created now from the palette, and starts a mode for creating that item 1002a. Then, the mouse pointer 1003 is moved to the canvas 1001, which is the actual workplace, and dragging is carried out to decide the size of the item, and create it. In the example shown in FIG. 14, a rectangular item is selected. Thus, conventional plotting or graphics software applications require a number of operations to perform the potentially repetitive task of creating a graphical element such as the illustrated rectangle. Any such additional, unnecessary operations elongate the quantity of time required to achieve a desired result (e.g., the creation of an image, illustration, diagram or the like) and over time may cause repetitive stress-related injuries.

BRIEF SUMMARY

A system, method, and computer program product that have a graphical user interface capable of easily generating different kinds of items on a canvas by a user by operation of a mouse pointer on the canvas without requiring movement of the mouse pointer between a palette and the canvas are provided herein. In accordance with one embodiment of the present invention a system is provided which comprises displaying means to display a pointer and a positional reference on a display screen; input means to accept an operation by a user; and control means to control a position and a function of the pointer on the display screen in response to the operation; wherein the control means determines the function of the pointer according to a distance between the position of the pointer and the positional reference.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, software, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

It is believed that the above features, advantages and purposes of the invention will be better understood from the following description of the preferred embodiments of the invention taken in conjunction with the accompany drawings, in which.

The use of the same or similar reference symbols within the accompanying drawings is intended to indicate similar or identical items.

DETAILED DESCRIPTION

Figure 1:
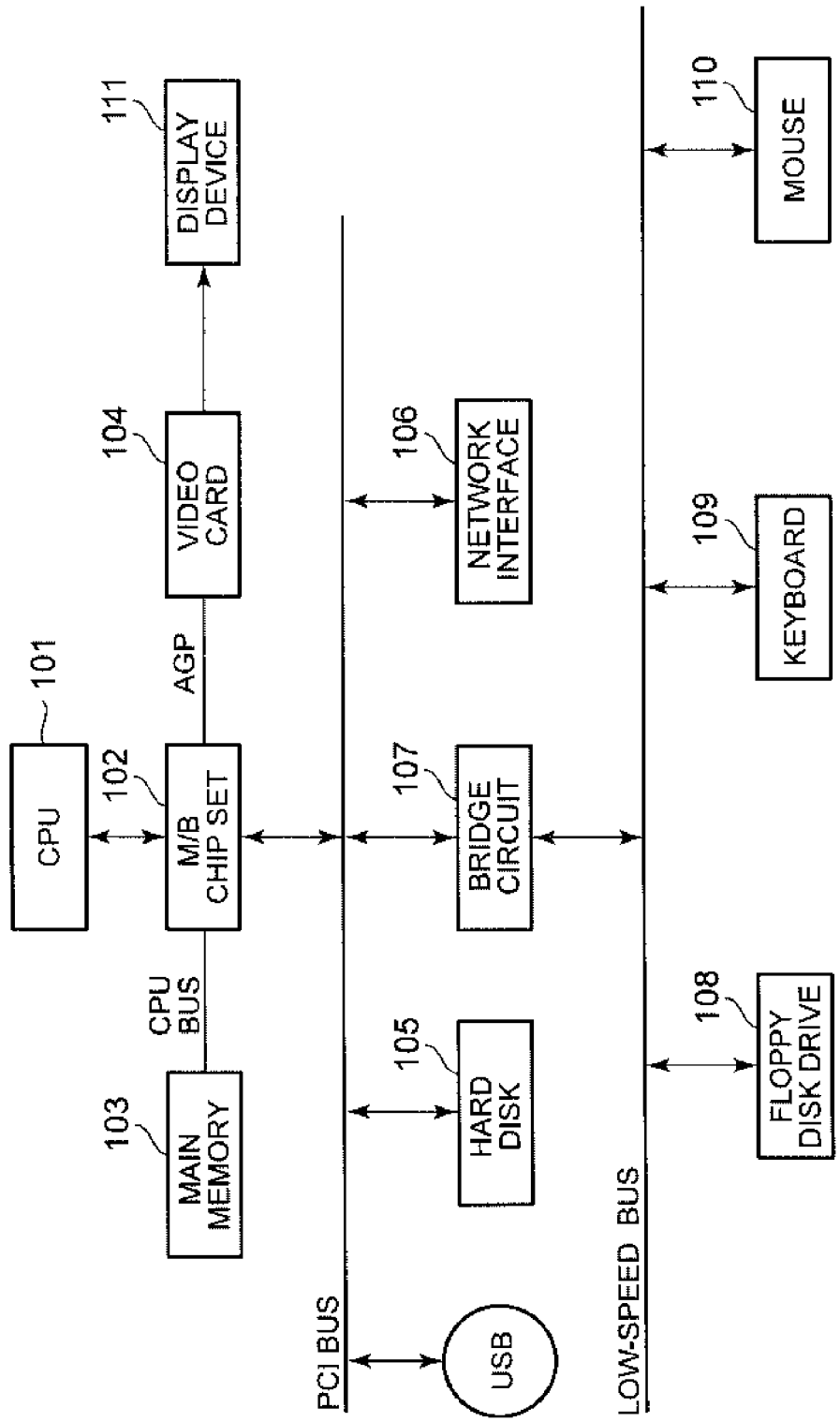
FIG. 1 is a view diagrammatically showing an example of a hardware configuration of a computer device realizing a system, a method, and a computer program product according to an embodiment of the present invention.

An embodiment of a system, a method and a computer program product according to embodiments of the present invention will be described below. However, the present invention may be diversely modified and varied, and is not limited to the description of the embodiment below. In the figures being referenced in the present embodiment, the same reference numerals are applied to the same elements, the same parts, and portions with the same functions, and the repeated explanation thereof is omitted.

The present invention has been made with a view to solving one or more problems evident in conventional graphical user interfaces. In various embodiments of the present invention a system, a method, and a computer program product each having a graphical user interface capable of easily generating different kinds of items on a canvas by a user by operation of a mouse pointer on the canvas without requiring movement of the mouse pointer between a palette and the canvas are provided.

In accordance with one embodiment of the present invention, there is provided a system including: displaying means that displays a pointer and a positional reference on a display screen; input means that accepts an operation by a user; and control means that controls a position and a function of the pointer on the display screen in response to the operation, wherein the control means determines the function of the pointer according to a distance between the position of the pointer and the positional reference.

In the described embodiment, the system further includes drawing means that draws an image on the display screen, in response to the function of the pointer and the operation.

In the described embodiment, the displaying means displays a plurality of straight lines in a horizontal or "lateral" direction and a plurality of straight lines in a vertical direction on the display screen, and the positional reference is one of a plurality of intersecting points of the plurality of straight lines in the lateral direction and the vertical direction, which is located closest to the position of the pointer.

In the described embodiment, the displaying means displays the plurality of straight lines in the vertical direction with a constant interval in the lateral direction and the plurality of straight lines in the lateral direction with a constant interval in the vertical direction on the display screen to form a grid on the display screen; and the positional reference is one of a plurality of intersecting points of the plurality of grids, which is located closest to the position of the pointer.

In the described embodiment, the grid is divided into a plurality of sub-grids, and wherein the control means is utilized to choose a first function as the function of the pointer, under a condition that the pointer is located within an area formed by 4 sub-grids adjoining the intersecting point closest to the pointer, and the control means is utilized to choose a second function as the function of the pointer, under a condition that the pointer is located outside of the area formed by the 4 sub-grids.

In the described embodiment, the control means is utilized to choose a first function as the function of the pointer in response to a condition that the distance between the position of the pointer and the positional reference is not greater than a predetermined threshold, and the control means is utilized to choose a second function as the function of the pointer in response to a condition that the distance between the position of the pointer and the positional reference is greater than the predetermined threshold.

In the described embodiment, the displaying means displays grids on the display screen; the positional reference is one of a plurality of intersecting points of the grids, which is located closest to the position of the pointer; and the control means is utilized to choose a ruled-line creation as the function of the pointer in response to a condition that the distance between the position of the pointer and the positional reference is not greater than a predetermined threshold, and the control means is utilized to choose a text-area creation as the function of the pointer in response to a condition that the distance between the position of the pointer and the positional reference is greater than a predetermined threshold.

In the described embodiment, the displaying means determines a display status of a cursor which indicates the position designated by the pointer on the display screen in response to the function of the pointer.

In the described embodiment, the display status includes a shape, a design, or a color of the cursor, or a combination thereof.

In the described embodiment, the drawing means displays a line segment on the display screen in response to the operation, under a condition that the control means is utilized to choose a ruled-line creation as the function of the pointer and the input means accepts a user's lateral dragging or vertical dragging as the operation and; the drawing means displays a rectangle on the display screen in response to the operation, under a condition that the control means is utilized to choose the ruled-line creation as the function of the pointer and the input means accepts a user's oblique dragging as the operation.

In the described embodiment, the displaying means includes a first display area and a second display area, wherein the first display area is a palette area for choosing the function of the pointer, and the second display area is a canvas area for drawing in response to the position and the function of the pointer and the operation by the user, and further wherein the control means changes the function of the pointer in response to the distance between the position of the pointer and the positional reference in the second display area.

In the described embodiment, the control means further changes a kind of the determined function of the pointer, under a condition that the input means accepts a specific operation from the user.

In the described embodiment, the control means further changes the determined function of the pointer to a text input, under a condition that the control means is utilized to choose a ruled-line creation as the function of the pointer and the input means accepts a specific operation from the user.

In the described embodiment, the control means further changes an attribute of the determined function of the pointer, under a condition that the input means accepts a specific operation from the user.

In the described embodiment, the control means changes a thickness of the ruled-line, under a condition that the control means is utilized to choose a ruled-line creation as the function of the pointer and the input means accepts a specific operation from the user.

In the described embodiment, the control means changes a color of a ruled-line, under a condition that the control means is utilized to choose a ruled-line creation as the function of the pointer and the input means accepts a specific operation from the user.

In the described embodiment, the input device includes a pointing device, and the specific operation is a double click of the pointing device.

In the described embodiment, the input device includes a keyboard, and the specific operation is to depress a specific key on the keyboard.

In addition, in accordance with another embodiment of the present invention, there is provided a method applied to a system including an input means, a control means, and a displaying means, the method including: displaying a pointer and a positional reference on a display screen utilizing the displaying means; accepting an operation from a user utilizing the input means; controlling a position and a function of a pointer on the display screen in response to the operation determining the function of the pointer according to a distance between the position of the pointer and the positional reference utilizing the control means.

In addition, in accordance with the present invention, there is provided a computer program product having a plurality of instructions executable by a computer embodied therein, wherein said plurality of instructions when executed cause the computer to perform a method comprising: displaying a pointer and a positional reference on a display screen; accepting an operation by a user; and controlling a position and a function of the pointer on the display screen in response to the operation, and determining the function of the pointer according to a distance between the positions of the pointer and the positional reference.

Embodiments of the present invention provide a method, system, and computer program product capable of easily generating different kinds of items on a canvas by a user only by an operation of a mouse pointer on a canvas without requiring movement of the mouse pointer between a palette and a canvas.

Reference is now made to FIG. 1. FIG. 1 is a view showing an example of a hardware configuration of a computer device for realizing a system, a method, and a computer program product according to the present embodiment. The computer device shown in FIG. 1 includes a CPU (Central Processing Unit) 101 which has arithmetic and control means; a main memory 103 connected to the CPU 101 via a M/B (mother board) chip set 102 and a CPU bus; a video card 104 connected to the CPU 101 via the M/B chip set 102 and an AGP (Accelerated Graphics Port); a display device 111 for displaying graphic data generated in the video card 111; a hard disk 105 and a network interface 106 connected to the M/B chip set 102 via a PCI (Peripheral Component Interconnect) bus; and further a floppy (trademark) disk drive 108, a keyboard 109, and a mouse 110 which are connected to the M/B chip set via a low-speed bus such as a bridge circuit 107, an ISA (Industry Standard Architecture) bus, and the like from the PCI bus. As the display device 111, for example, a liquid crystal display (LCD), a CRT display, and the like, can be used.

Incidentally, FIG. 1 shows a mere example of a computer device realizing the system, the method, and the computer program product of the embodiment of the present invention, and therefore any alternative design is acceptable as long as a computer device with a configuration capable of realizing the system, the method, and the computer program product according the embodiment of the present invention is used. For example, instead of providing the video card 104, it is possible to provide only video memory and perform process video data in the CPU 101, or it is also possible to provide a sound mechanism for inputting and outputting sound. Also, a CD-ROM (Compact Disk Read Only Memory) or a DVD-ROM (Digital Versatile Disc Read Only Memory) may be provided via an interface such as an ATA (AT Attachment), and the like. In addition, as input means for accepting a user operation, instead of the mouse 110, a pointing device such as a track pad, a track ball, a track point (trademark), and the like, a joystick, or the like, may be provided.

Figure 2:
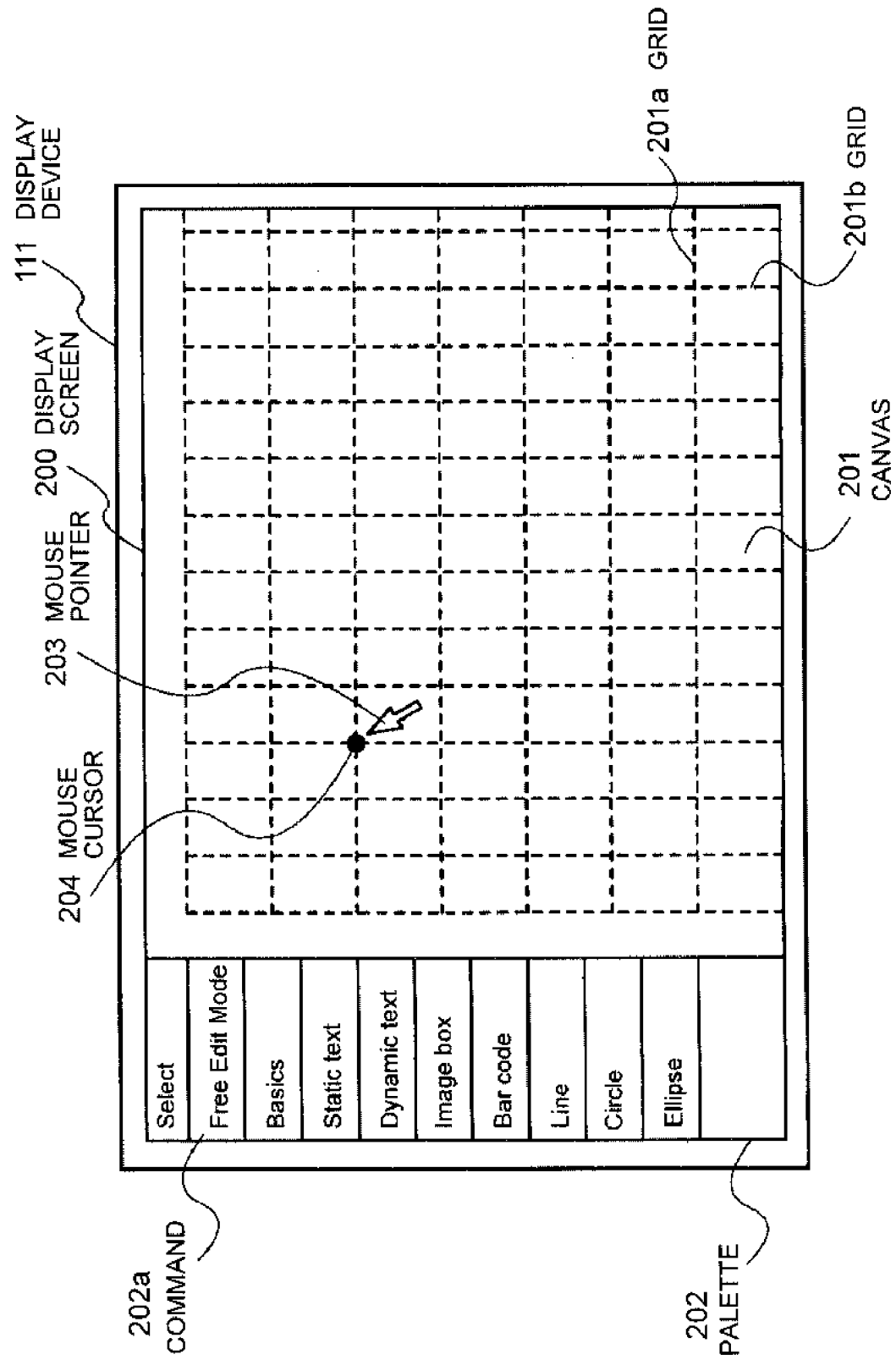
FIG. 2 is a view showing an example of a display screen shown in a displaying device 111 of the system according to the embodiment of the present invention.

Reference is now made to FIG. 2. The system of the present embodiment according to the present invention has a graphical user interface for realizing a display as shown in FIG. 2. FIG. 2 is a view showing an example of a display screen of the graphical user interface shown in the display device 111 of the system of the present embodiment according to the present invention. In the system of the present embodiment, the graphical user interface is controlled by a control portion in the CPU 101, and the display of the display device 111 is controlled by a display portion in the system of the present invention.

As shown in FIG. 2, a display screen 200 displays a canvas 201, which is a display area for displaying drawing means for creating items such as a line, a ruled-line, a rectangle, a circle, a text, and the like. Lateral grids 201a which are lines displayed on the canvas 201 in the lateral direction, and the vertical grids 201b which are lines displayed thereon in the vertical direction, are arranged with constant intervals in the vertical direction and lateral direction, respectively. They are lines providing a reference when an item such as a line, a ruled-line, a rectangle, a circle, a text, and the like is created. Points at which the lateral grids 201a and the vertical grids 201b intersect are grid intersecting points. Reference numeral 202 designates a palette which includes creation commands (drawing means) 202a for creating various ruled-lines and graphics. By selecting one of the creation commands 202a, a user can select a function of the system of the present invention according to the present embodiment. Reference numeral 203 designates a mouse pointer, which is controlled by a pointing device such as the mouse 110, a track ball, and the like. Reference numeral 204 designates a mouse cursor (also simply called a cursor), which is a portion displayed at one of the intersecting points of the lateral grids 201a and the vertical grids 201b selected by the mouse pointer 203, to serve as a reference or a positional reference for creating an item.

In the system of the present invention according to the present embodiment, usually, an item such as a rectangle, a circle, and the like is created from the position of the mouse cursor 204, which serves as the positional reference, being displayed at the intersecting point of the lateral grid 201a and the vertical grid 201b selected by the mouse pointer 203. In this sort of normal mode, the user can select the item to create on the canvas 202 by selecting one of the plotting commands in the palette 202. On the other hand, in the present embodiment, by selecting "Free Edit Mode" from the commands in the palette 202, during the editing work, the mode for creating an item, which is a function of the mouse pointer, is automatically changed according to position information of the mouse pointer 203, and it is possible to switch among a plurality of modes for creating items. In this instance, when the mouse pointer 203 is placed on the canvas, the display status of the mouse cursor 204 is changed depending on the position of the mouse pointer 203 on the lateral grid 201a and the vertical grid 201b. As such, it is possible to determine which mode is selected for creating an item at present from the changed display status of the mouse cursor 204. In the present embodiment, the mode for creating an item selected at present may be determined from the change in the display status of the mouse cursor 204, however, it is possible also to determine which mode is selected from the change in a design or a color, or the combination thereof, of the mouse pointer 203

The "Free Edit Mode", which is a function of the mouse pointer automatically changing the mode for creating an item among the plurality of the modes for creating items according to the position information of the mouse pointer 203 is explained with reference to FIGS. 3A and 3B. Incidentally, in the present invention, this mode is named the "Free Edit Mode", however, needless to say, the name of this mode is not limited to this.

Figure 3A:
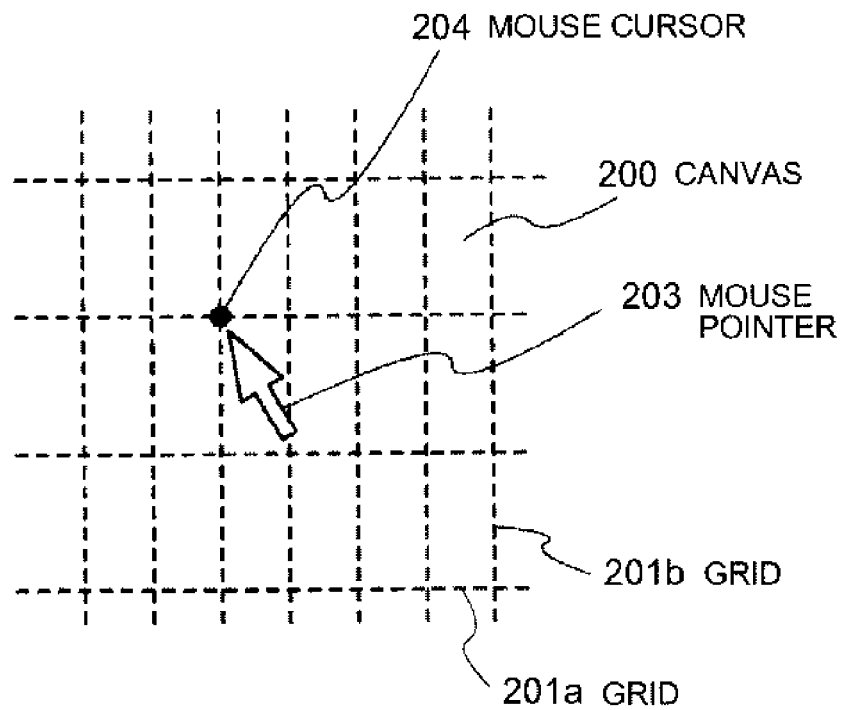
FIGS. 3A and 3B are views explaining switching of items in the system, the method, and the computer program product according to the embodiment of the present invention.

In the "Free Edit Mode" of the present embodiment, when the mouse pointer 203 is close to the intersecting point of the lateral grid 201a and the vertical grid 201b, that is, when the distance between the position of the mouse pointer 203 and the intersecting point of the lateral grid 201a and the vertical grid 201b, which is closest to the mouse pointer 203, is equal to or less than a predetermined threshold, the mouse cursor 204 has the shape of a dot, as shown in FIG. 3A. When the mouse cursor 204 is dragged from the intersecting point of the both grids, the mode for creating an item automatically becomes a ruled-line creation mode (for example, a mode of a first function). Incidentally, in the present embodiment, the ruled-line creation mode can create a line and a rectangle.

Figure 3B:
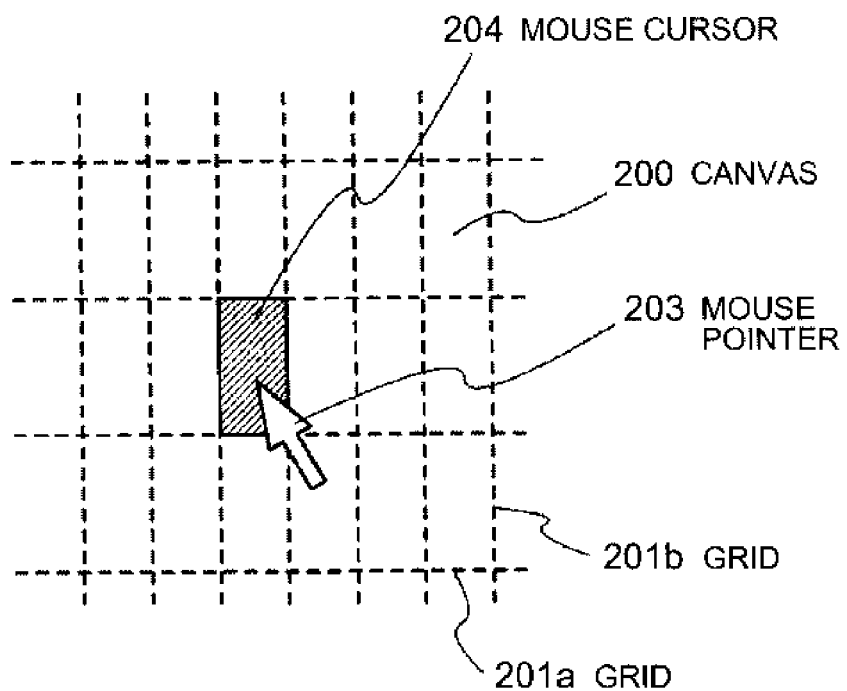

In the Free Edit Mode of the present invention, on the other hand, when the mouse pointer 203 is distant from the intersecting point of the lateral grid 201a and the vertical grid 201b, that is, when a distance between the position of the mouse pointer 203 and the intersecting point of the lateral grid 201a and the vertical grid 201b, which is closest to the mouse pointer 203, is equal to or greater than the predetermined threshold, the mouse cursor 204 has the shape of a rectangle (the shape of a cell), as shown in FIG. 3B. When the mouse cursor 204 is dragged from the inside of the cell, the mode for creating an item automatically becomes a text creation mode (for example, a mode of a second function).

Thus, in the present embodiment, it is possible to automatically change the mode for creating an item according to the position information of the mouse pointer 203 and to switch among a plurality of the modes for creating items. And thus, in the system of the present invention, it is possible to automatically switch the kinds of items to be created, only by the position of the mouse pointer 203 without using the palette 202. Incidentally, this automatic switching of the kinds of items is controlled by the control portion of the CPU 101.

Now, the creation of an item of the present embodiment is explained in detail with reference to FIGS. 4A to 6C.

Figure 4A:
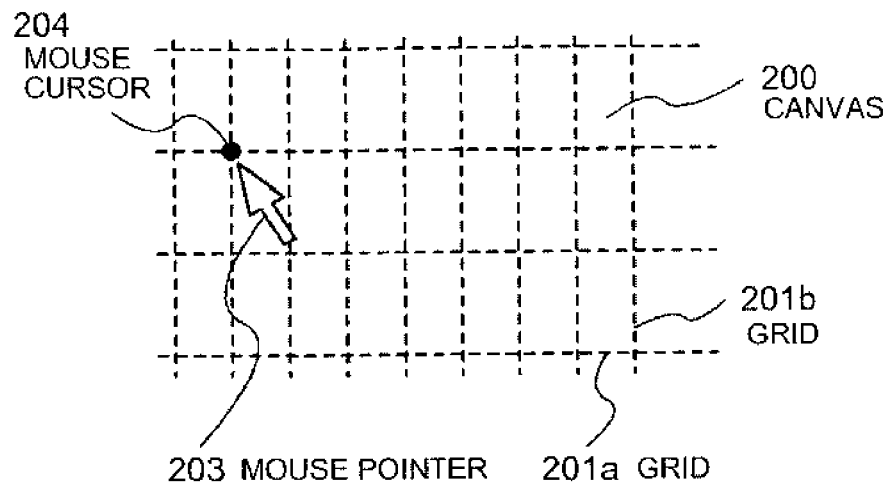
FIG. 4A to 4C are views showing creation of an item according to the embodiment of the present invention.
Figure 4B:
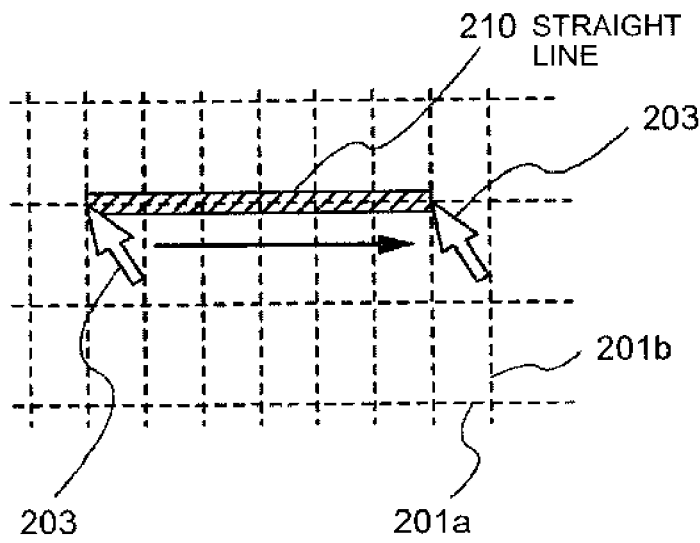
Figure 4C:
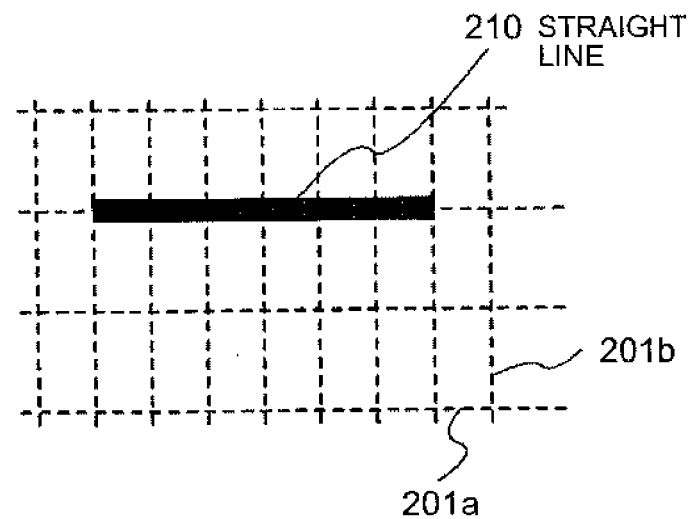

First, reference is made to FIGS. 4A to 4C. When the mouse pointer 203 is close to the intersecting point of the lateral grid 201a and the vertical grid 201b, the mouse cursor 204 has the shape of a dot, as shown in FIG. 4A. Then, when the user starts dragging the mouse pointer 203 substantially laterally from the intersecting point of the both grids, the creation of an item becomes a straight line creation mode among ruled-line creation modes, and a straight line 210 is formed in the lateral direction according to the movement of the mouse pointer 203 (FIG. 4B). Then, when the dragging of the mouse pointer 203 is stopped, the formation of the straight line 210 is completed. Also, this is not shown in the figures, even when the user starts dragging the mouse pointer 203 substantially vertically from the intersecting point of the both grids, the creation of an item becomes a straight line creation mode among ruled-line creation modes, and a straight line is formed in the vertical direction according to the movement of the mouse pointer 203. Then, when the dragging of the mouse pointer 203 is stopped, the formation of the straight line in the vertical direction is completed.

Figure 5A:
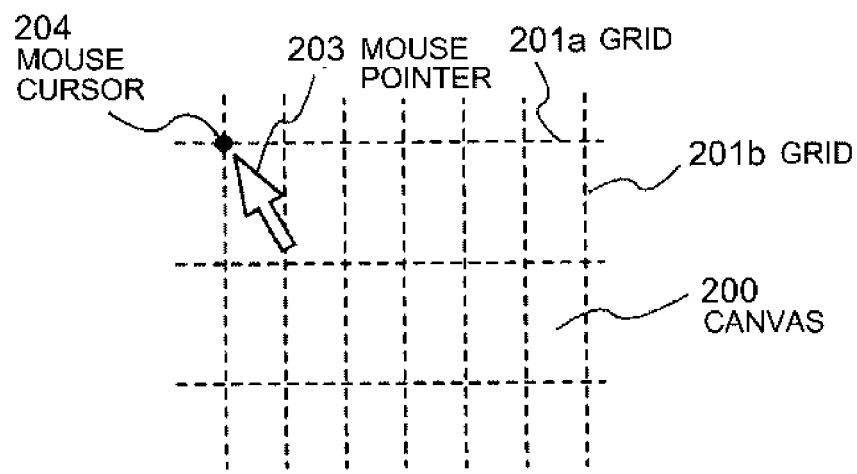
FIG. 5A to 5C are views showing creation of an item according to the embodiment of the present invention.
Figure 5B:
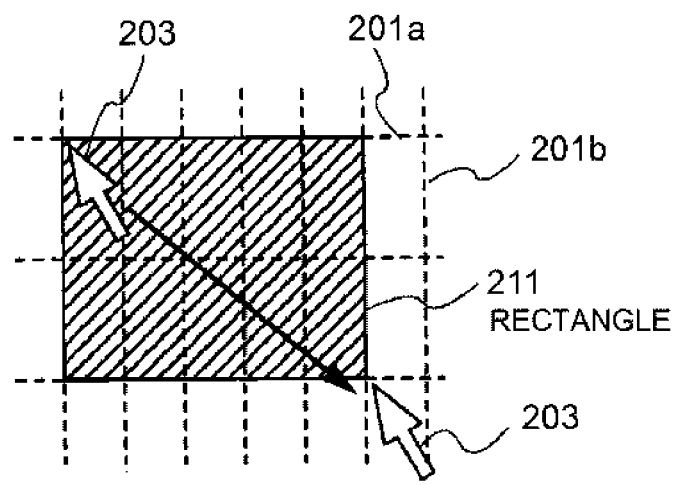
Figure 5C:
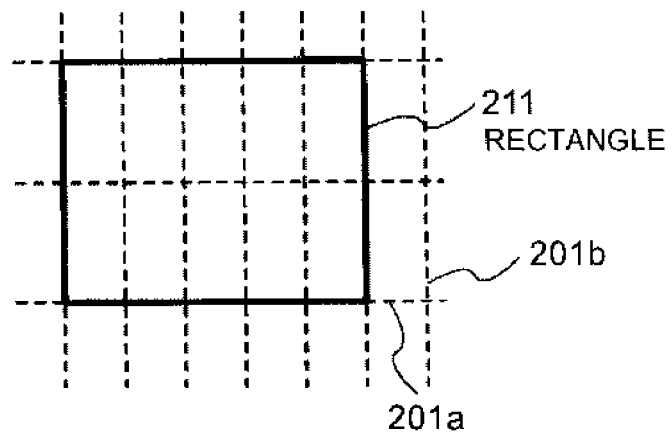

Next, reference is made to FIGS. 5A to 5C. When the mouse pointer 203 is close to the intersecting point of the lateral grid 201a and the vertical grid 201b, the mouse cursor 204 has a shape of a dot, as shown in FIG. 5A, as described previously. Then, when the user starts dragging the mouse pointer 203 obliquely from the intersecting point of the both grids, the creation of an item becomes a rectangle creation mode among ruled-line creation modes, and a rectangle 211 is formed according to the movement of the mouse pointer 203 (FIG. 5B). Then, when the dragging of the mouse pointer 203 is stopped, the formation of the rectangle 211 is completed.

Thus, in the present embodiment, if the mouse pointer 203 is close to the intersecting point of the lateral grid 201a and the vertical grid 201b, when the user starts dragging the mouse pointer 203 substantially laterally, substantially vertically, or obliquely, the straight line creation mode or a rectangle creation mode is automatically selected.

Figure 6A:
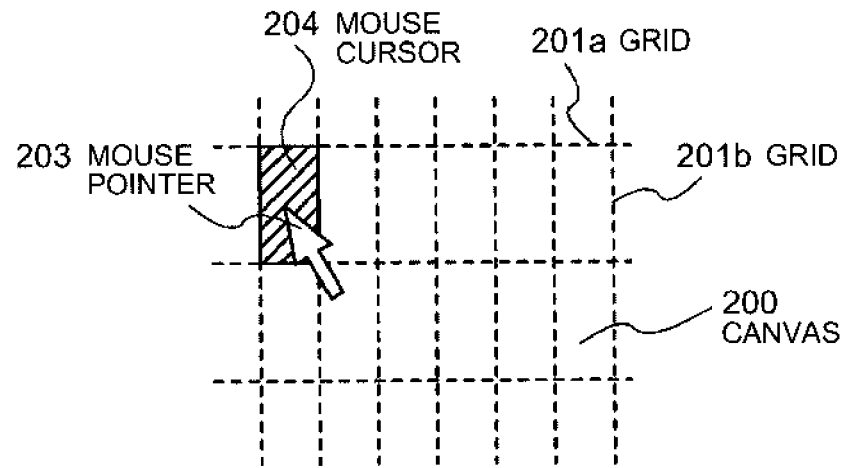
FIG. 6A to 6C are views showing creation of an item according to the embodiment of the present invention.
Figure 6B:
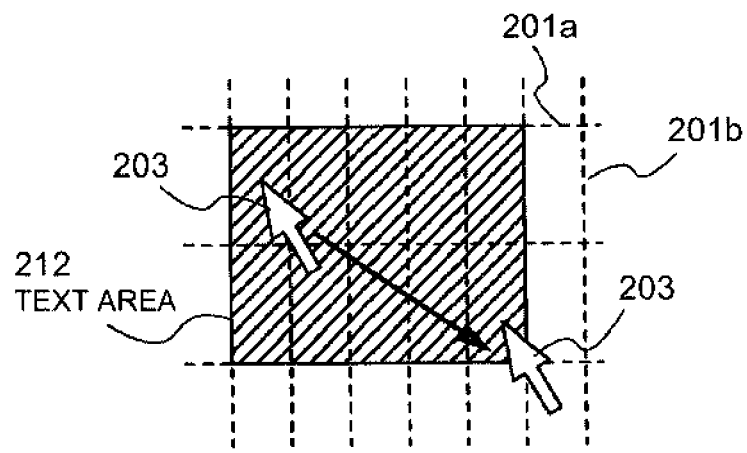
Figure 6C:
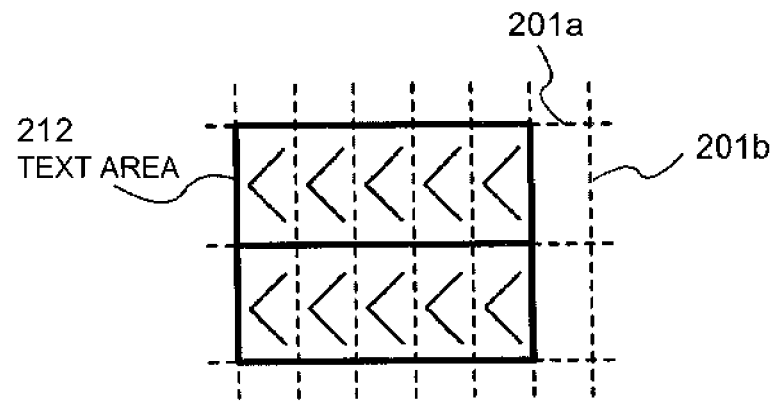

Next, reference is made to FIGS. 6A to 6C. When the mouse pointer 203 is distant from the intersecting point of the lateral grid 201a and the vertical grid 201b, that is, when the mouse pointer is at an inner position in the cell formed by the lateral grids 201a and the vertical grids 201b, the mouse cursor 204a has a shape of a cell, as shown in FIG. 6A. Then, when the user starts dragging the mouse pointer 203 obliquely from the inside of the cell, the creation of an item becomes a text item creation mode, and a text area 212 is formed according to the movement of the mouse pointer 203 (FIG. 6B). Then, when the dragging of the mouse pointer 203 is stopped, the formation of the text area 212 is completed.

Figure 7A:
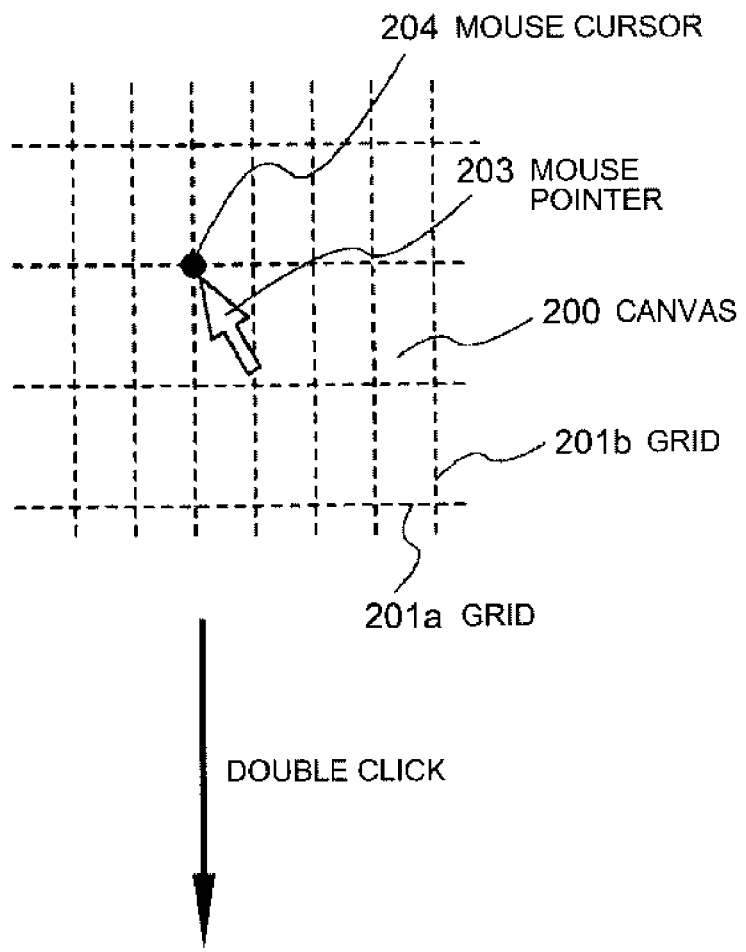
FIGS. 7A and 7B are views showing creation of an item according to the embodiment of the present invention.
Figure 7B:
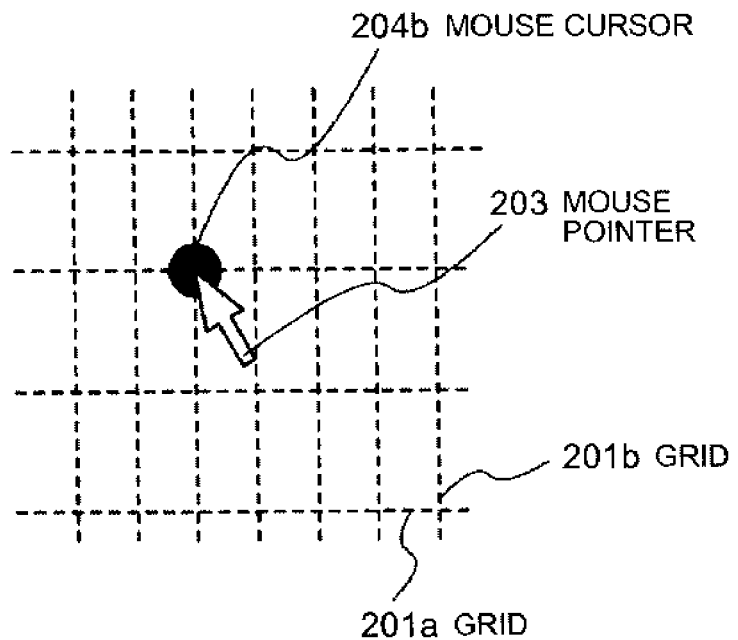

Also, in the case where the mouse pointer 203 is close to the intersecting point of the lateral grid 201a and the vertical grid 201b, as shown in FIGS. 7A and 7B, it may be also possible to change the an attribute of the mouse pointer 203 such as a thickness, a design, a color, and the like, of a line to be formed, by double clicking a pointing device such as a mouse to change the size or the color of the mouse cursor 204b. Incidentally, it may be also possible to have a structure such that a thickness, a design, and a color of a line to be formed may be changed by pressing the Shift key or Ctrl key of the keyboard 109, instead of double clicking a pointing device such as a mouse.

Also, in the case where the mouse pointer is at an inner position in the cell formed by the lateral grids 201a and the vertical grids 201b, although this is not shown in the figures, it may be also possible to have a structure such that a size, a font, a color, and the like, of text to be formed in a text area may be changed by double clicking a pointing device such as a mouse to change the size or the color of the mouser cursor 204b. Incidentally, it may be also possible to have a structure such that the size, the font, the color, and the like, of a text to be formed in a text area may be changed by pressing the Shift key or the Ctrl key of the keyboard 109, instead of double clicking a pointing device such as a mouse.

Figure 8:
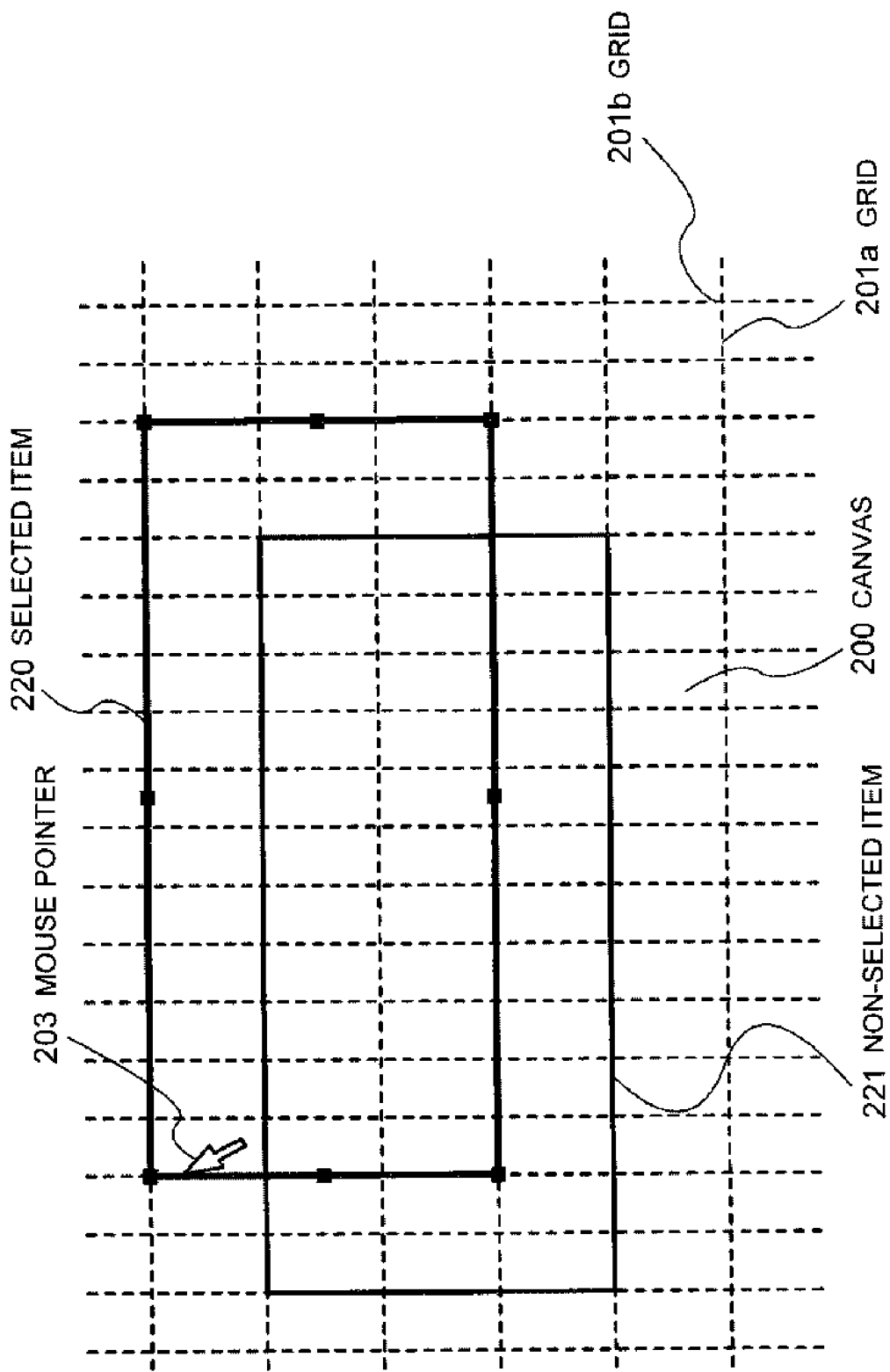
FIG. 8 is a view showing selection of an item according to the embodiment of the present invention.

Furthermore, the system may also have a structure such that items on the canvas 202 can be selected by pressing the Shift key or Ctrl key of the keyboard 109. FIG. 8 is a view showing a selected item 220 selected by pressing the Ctrl key of the keyboard 109 and placing the mouse pointer 203 on the selected item. The selected item 220 selected in this way can be moved or deleted.

Figure 9:
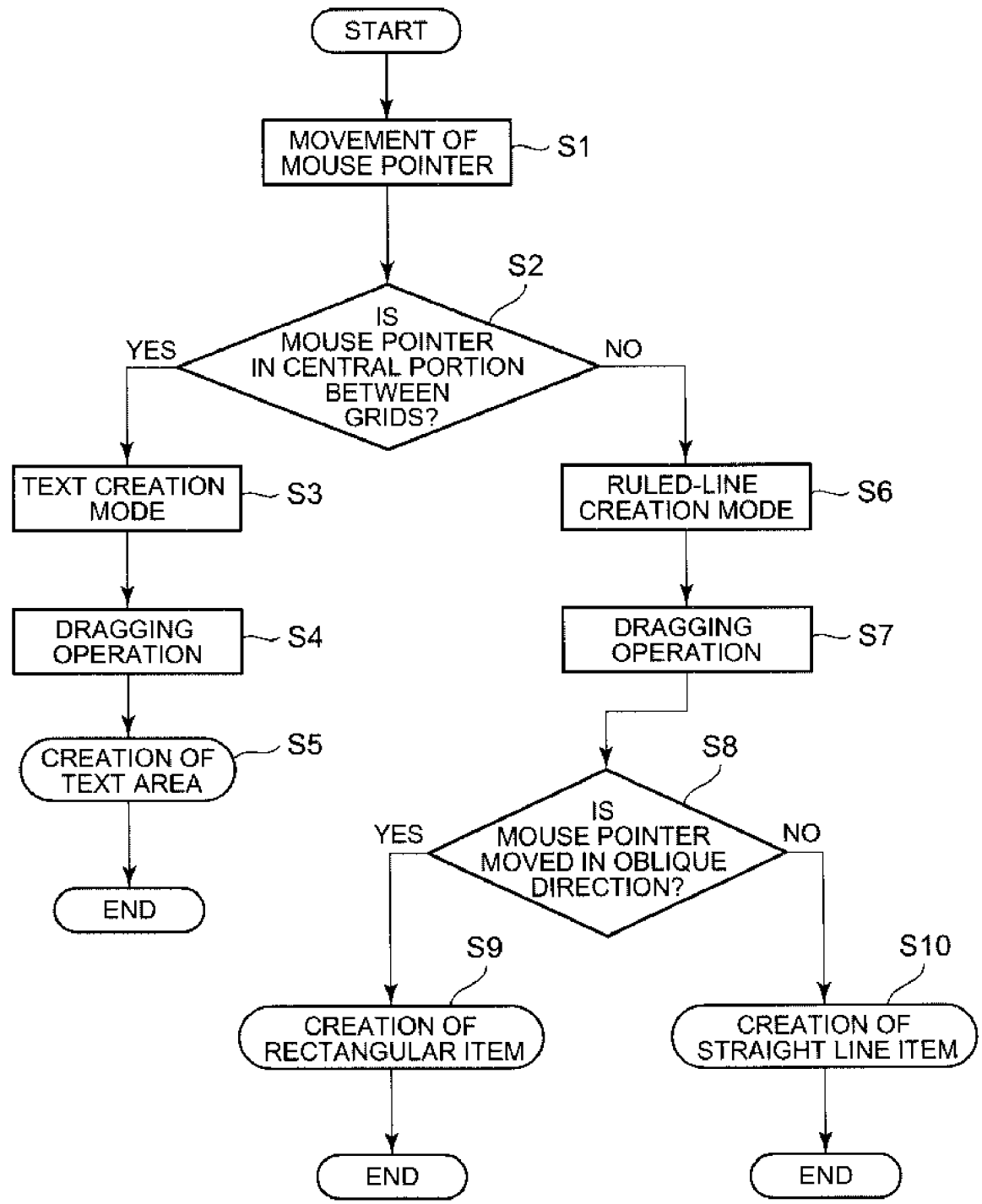
FIG. 9 is a flowchart of the embodiment of the present invention.

FIG. 9 shows a flowchart of the system, the method and the computer program product according to the present invention. First, the movement of the mouse pointer 203 caused by moving a pointing device such as a mouse is detected (process block S1), and it is determined whether or not the mouse pointer 203 is close to the lateral grid 201a and the vertical grid 201b (whether or not the mouse pointer 203 is in the central portion between the grids) (process block S2). When the mouse pointer 203 is not close to the lateral grid 201a and the vertical grid 201b (the mouse pointer 203 is in the central portion between the grids), the text creation mode is selected (process block S3), the dragging operation of the pointing device such as a mouse is carried out (process block S4), and so a text area item is created (process block S5). Also, in process block S2, when the mouse pointer 203 is close to the lateral grid 201a and the vertical grid 201b (the mouse pointer 203 is not in the central portion between the grids), the ruled-line creation mode (process block S6) is selected. According to the subsequent dragging operation of the pointing device such as a mouse (process block S7), it is determined whether or not the mouse pointer 203 is moved in an oblique direction (process block S8). When the mouse pointer 203 is moved in an oblique direction, the rectangle creation mode among the ruled-line creation modes, is selected, and a rectangle item is created (process block S9). On the other hand, when the mouse pointer 203 is not moved in an oblique direction, that is, when the mouse pointer 203 is moved substantially laterally, or substantially vertically, the straight line creation mode among the ruled-line creation modes, is selected, and a straight line is created (process block S10).

The determination of the position of the mouse pointer 203 in the present embodiment will be explained next. Incidentally, the determination of the position of the mouse pointer 203 explained here is merely one example of the system of the present invention.

Figure 10:
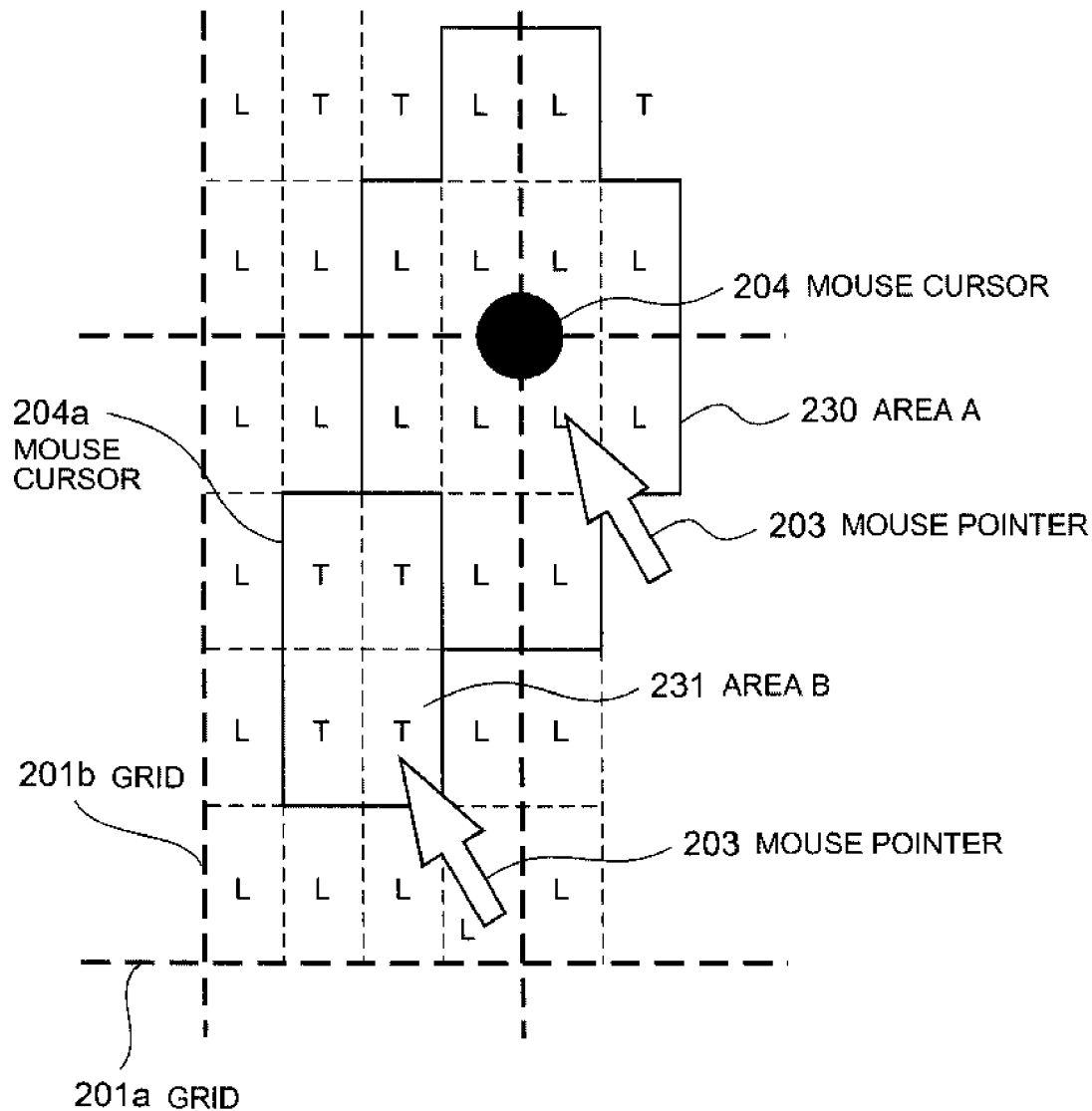
FIG. 10 is a view showing a determination method of switching of items according to the embodiment of the present invention.

In the present embodiment, as shown in FIG. 10, the lateral grids 201a and the vertical grids 201b are divided into four, respectively, and thereby the cell formed by the adjoining lateral grids 201a and the adjoining vertical grids 201b is divided into sixteen sub-areas. Among the divided sixteen sub-areas, an area formed by the sub-areas adjoining the lateral grids 201a and the vertical grids 201b is termed an area A (230), and an area formed by the sub-areas not adjoining the lateral grids 201a and the vertical grids is termed an area B (231). Incidentally, for convenience of explanation, among the sixteen sub-areas, the sub-areas belonging to the area A are marked "L", and the sub-areas belonging to the area B are marked "T". In the present embodiment, the cell formed by the adjoining lateral grids 201a and the adjoining vertical grids 201b is divided into sixteen sub-areas, the number of divisions is not limited to this, and also the number of the vertical divisions and the number of the lateral divisions may differ.

In the present embodiment, when the mouse pointer 203 is in the area A (230), the mouse pointer 203 is determined to be close to the lateral grid 201a and/or the vertical grid 201b (the mouse pointer 203 is not in the central portion between the grids), and the ruled-line creation mode is carried out (process block S6). On the other hand, when the mouse pointer 203 is in the area B (231), the mouse pointer 203 is determined to be distant from the lateral grid 201a and/or the vertical grid 201b (the mouse pointer 203 is in the central portion between the grids), and the text creation mode is carried out (process block S3).

In this way, the function of the present invention can be realized, in which the location of the mouse pointer 203 is determined, and when the mouse pointer 203 is close to an intersecting point of the lateral grid 201a and the vertical grid 201b, the ruled-line mode is carried out, and on the contrary, when the mouse pointer is in the central portion between the adjoining grids, the text creation mode is carried out.

Figure 11:
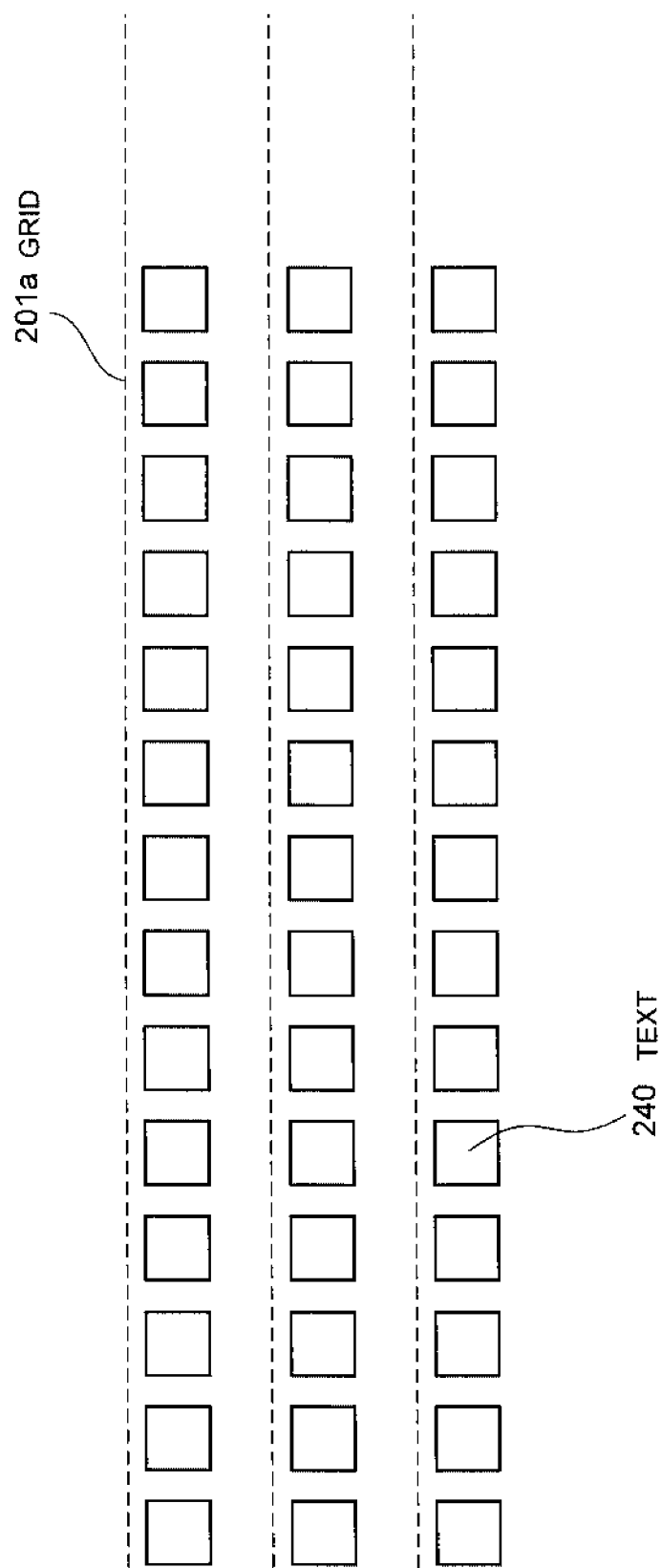
FIG. 11 is a view showing creation of an item according to the embodiment of the present invention.
Figure 12:
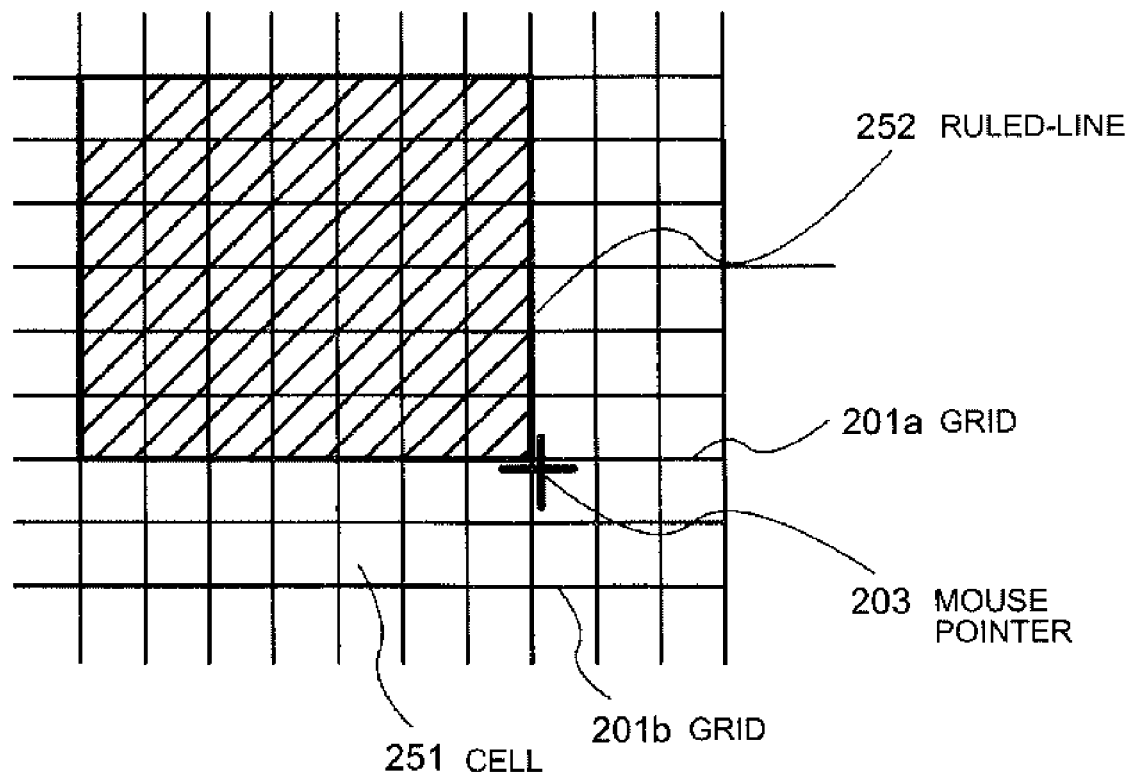
FIG. 12 is a view showing creation of an item according to the embodiment of the present invention.
Figure 13:
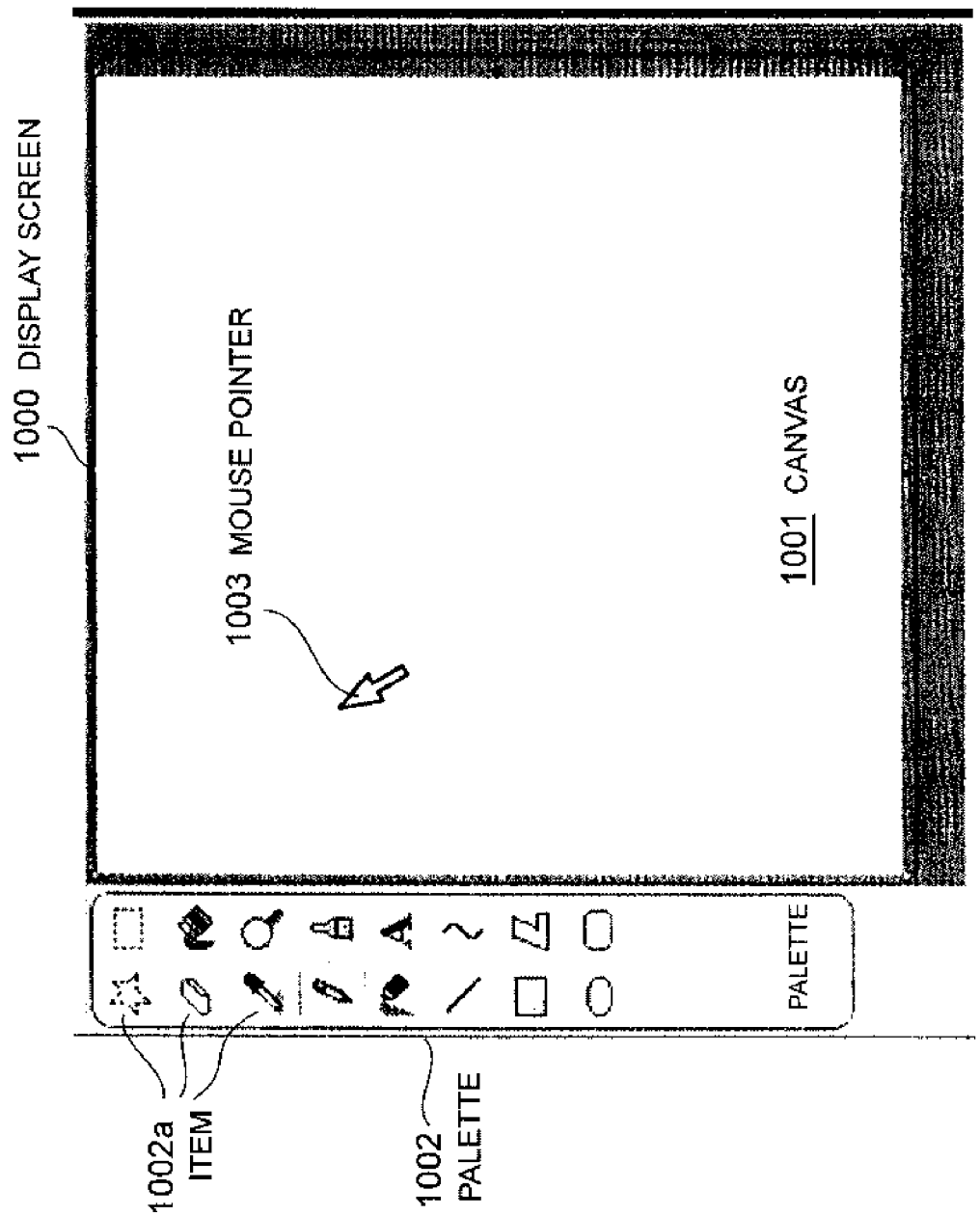
FIG. 13 is a view showing an example of a display screen of a conventional plotting software application according to the prior art.
Figure 14:
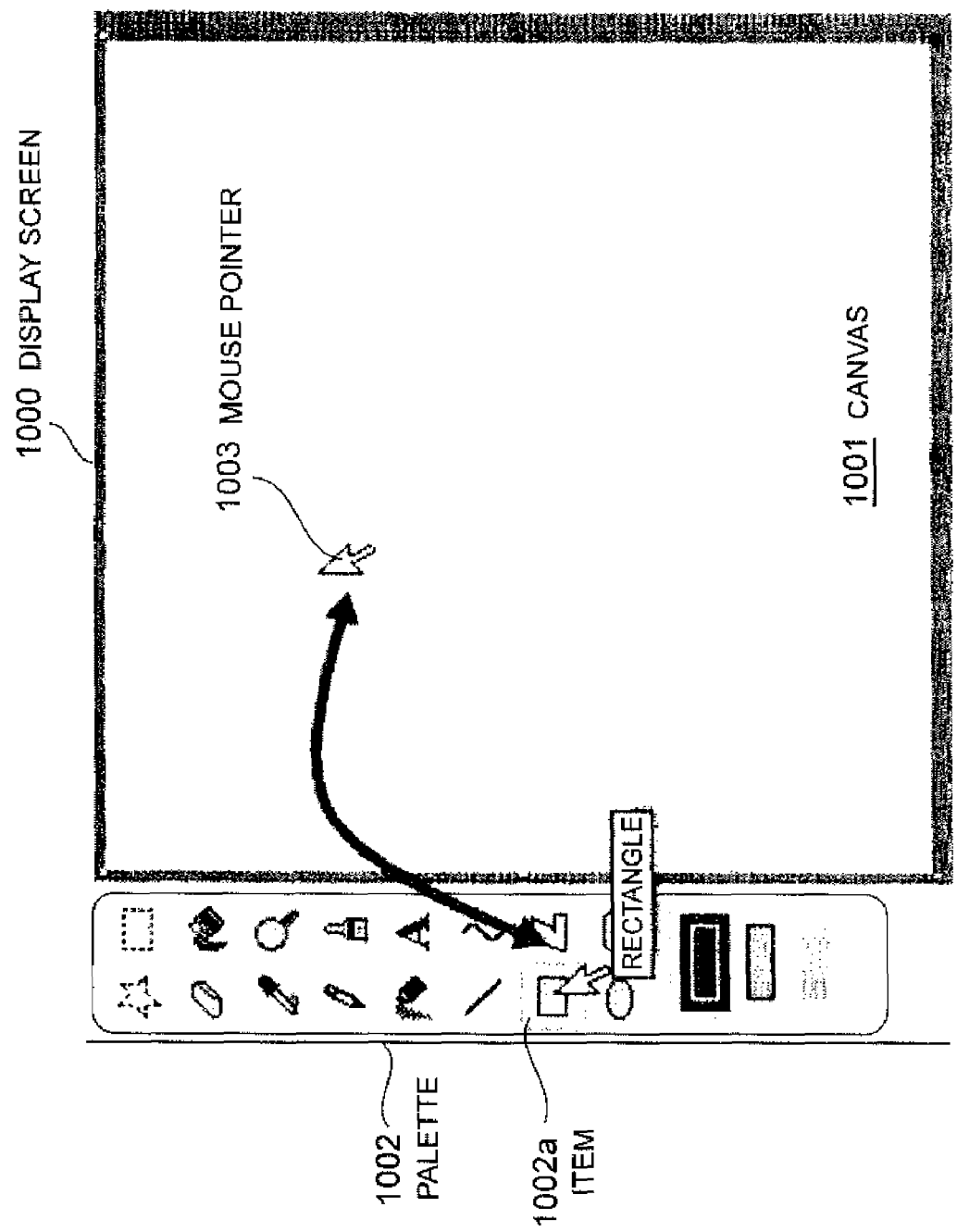
FIG. 14 is a view showing an example of the utilization of the display screen of FIG. 13 according to the prior art.

In the present embodiment, the canvas 201 has the lateral grids 201a and the vertical grids 201b, and the position of the mouse cursor 204 or 204a is decided by the grids, but the system of the present invention is not limited to this, and the present invention can be applied to, for example, a canvas with only lateral grids 201a, like a notebook, or a canvas with dots aligned vertically and laterally with the same intervals. For example, as shown in FIG. 11, if a canvas with only lateral grids 201a, like a page of a notebook, is used, when the mouse cursor is close to the lateral grid, the mouse cursor is formed in a dot shape and the ruled-line creation mode may be selected. On the other hand, when the mouse cursor is between the lateral grids, the mouse cursor is formed in a cell shape and the text creation mode for forming a text area 240 may be selected. Also, for example, if a canvas with dots aligned vertically and laterally with the same intervals is used, when the mouse cursor is close to one of the dots, the mouse cursor becomes a dot shape and the ruled-line creation mode may be selected. On the other hand, when the mouse cursor is between the dots, the mouse cursor is formed in a cell shape and the text creation mode may be selected. Furthermore, for example, even if a canvas with cells 251 in a matrix as shown in FIG. 12, automatic switching between the text creation mode and the ruled-line creation mode can be conducted, depending upon whether or not the mouse pointer 203 is close to the lateral grid 201a and the vertical grid 201b.

Furthermore, in the system of the present invention, the shape of the mouse cursor may be changed, and the mode for creating items may be switched, based on grids, dots, lines, and the like, shown on an image (including writing paper, an invoice, and the like) scanned by an imaging device such as a scanner.

As described above, the system, the method, and the computer program product of the present invention are capable of easily generating different kinds of items on a canvas by a user by only the operation of a mouse pointer on the canvas without reciprocally moving the mouse pointer between a palette and the canvas.

The system, the method, and the computer program product of the present invention are capable of providing an excellent graphical user interface which can be widely adopted in plotting software, an editor, and the like, such as a drawing tool and a CAD program which require the creation of different kinds of items.

What is claimed is:

1. A system for drawing an item on a display screen comprising:
    means for displaying a plurality of horizontal and vertical straight lines forming a grid and a plurality of grid intersections and for displaying a pointer that moves by the movement of a input device on the display screen;
    means for receiving a drag operation of the input device;
    means for determining a function of the pointer in response to a initiation position of the pointer by the drag operation and a position standard;
        wherein the position standard is the grid intersection closest the initiation position of the pointer; and
        wherein the function is determined based on the distance between the initiation position of the pointer and the position standard; and
    means for drawing the item on the display screen based on said drag operation and said function of said pointer.

2. The system according to claim 1:
    wherein the means for determining selects a first function of the pointer on the condition that the distance between the initiation position of the pointer by the drag operation and the position standard is not greater than a predetermined threshold value; and
    wherein the means for determining selects a second function of the pointer on the condition that the distance between the initiation position of the pointer by the drag operation and the position standard is greater than a predetermined threshold value.

3. The system according to claim 1:
    wherein the means for determining selects a ruled line as the function of the pointer on the condition that the distance between the initiation position of the pointer by the drag operation and the position standard is not greater than a predetermined threshold value;
    wherein the means for determining selects a text area as the function of the pointer on the condition that the distance between the initiation position of the pointer by the drag operation and the position standard is greater than a predetermined threshold value.

4. The system according to claim 1:
wherein the means for displaying further displays a cursor indicating a position specified by the pointer on the display screen; and
wherein the means for determining further determines a display mode of the cursor based on the determined function of the pointer.

5. The system according to claim 4:
wherein the display mode includes a shape, a pattern, a color and any combination thereof of the cursor.

6. The system according to claim 1:
wherein the display screen comprises a first display area and a second display area
the first display area being a palette area for selecting the function of the pointer; and
the second display area being a canvas area for displaying the grid and the item.

7. The system according to claim 6:
wherein the means for determining further changes the function of the pointer on the condition that the reception unit receives a specified selected function by the pointer in the palette area.

8. The system according to claim 1:
wherein the means for determining further changes an attribute of the determined function on the condition that the reception unit receives a specified operation by the input device.

9. The system according to claim 1
wherein the means for determining determines a ruled line as the function of the pointer and changes the thickness of the ruled line on the condition that the reception unit receives a specified operation by the input device.

10. The system according to claim 1
wherein the means for determining determines a ruled line as the function of the pointer and changes the color of the ruled line on the condition that the reception unit receives a specified operation by the input device.

11. The system according to claim 8:
wherein the input device includes a pointing device; and
the specified operation is double clicks of the pointing device.

12. The system according to claim 8:
wherein the input device includes a keyboard; and
the specified operation is to press a specified key on the keyboard.

13. A method for drawing an item on a display screen comprising:
displaying a plurality of horizontal and vertical straight lines forming a grid and a plurality of grid intersections and displaying a pointer that moves by the movement of a input device;
receiving a drag operation of the input device;
determining a function of the pointer in response to a initiation position of the pointer by the drag operation and a position standard;
wherein the position standard is the grid intersection closest the initiation position of the pointer; and
wherein the function is determined based on the distance between the initiation position of the pointer and the position standard; and
drawing the item on the display screen based on said drag operation and the function of said pointer.

14. A computer program product having a plurality of instruction executable by a computer embodies therein, wherein said plurality of instructions when executed cause the computer to perform a method for drawing an item on a display screen comprising:
displaying a plurality of horizontal and vertical straight lines forming a grid and a plurality of grid intersections and displaying a pointer that moves by the movement of a input device;
receiving a drag operation of the input device;
determining a function of the pointer in response to a initiation position of the pointer by the drag operation and a position standard;
wherein the position standard is the grid intersection closest the initiation position of the pointer; and
wherein the function is determined based on the distance between the initiation position of the pointer and the position standard; and
drawing the item on the display screen based on said drag operation and the function of said pointer.

* * * * *